(12) United States Patent
Sevastian

(10) Patent No.: US 6,748,667 B2
(45) Date of Patent: Jun. 15, 2004

(54) LOW PROFILE, ONE HAND GO-NO-GO GAGE AND LOCATOR

(75) Inventor: Nicolae Radu Sevastian, Windsor (CA)

(73) Assignee: L&L Products, Inc., Romeo, MI (US)

( * ) Notice: Subject to any disclaimer, the term of this patent is extended or adjusted under 35 U.S.C. 154(b) by 0 days.

(21) Appl. No.: 10/218,824

(22) Filed: Aug. 14, 2002

(65) Prior Publication Data
US 2004/0031164 A1 Feb. 19, 2004

(51) Int. Cl.[7] .............................. G01B 3/50; G01B 5/12
(52) U.S. Cl. ...................... 33/501.45; 33/501.5; 33/644
(58) Field of Search ...................... 33/501.45, 501.08, 33/501.5, 613, 644, 645, 783, 542, 544.4, 545, 555.1, 679.1

(56) References Cited

U.S. PATENT DOCUMENTS

| | | | | |
|---|---|---|---|---|
| 930,330 A | * | 8/1909 | Coe | 33/542 |
| RE14,743 E | * | 10/1919 | Bryant | 33/501.45 |
| 1,628,741 A | * | 5/1927 | Ritchey et al. | 33/542 |
| 2,117,317 A | * | 5/1938 | Hakenjos et al. | 33/501.45 |
| 2,199,052 A | * | 4/1940 | Lee | 33/501.45 |
| 2,213,767 A | * | 9/1940 | Markwick | 33/542 |
| 2,314,582 A | * | 3/1943 | Gerich | 407/1 |
| 2,345,750 A | * | 4/1944 | Hohwart | 33/501.45 |
| 2,375,945 A | * | 5/1945 | Redmer | 33/501.45 |
| 2,592,409 A | * | 4/1952 | Frankland | 33/542 |
| 2,808,654 A | * | 10/1957 | Long | 33/613 |
| 3,845,562 A | * | 11/1974 | Dallas | 33/605 |
| 3,872,600 A | * | 3/1975 | Siminsky | 33/542 |
| 3,957,371 A | | 5/1976 | Rich | |
| 4,500,079 A | | 2/1985 | Morghen | |
| 4,500,275 A | | 2/1985 | Ruhl | |
| 4,538,355 A | | 9/1985 | Morghen | |
| 5,199,180 A | * | 4/1993 | Yablonsky | 33/501.45 |
| 5,224,825 A | | 7/1993 | Strang et al. | |
| 5,590,474 A | * | 1/1997 | Lamb | 33/645 |
| 5,644,817 A | | 7/1997 | Bender et al. | |
| 5,722,648 A | | 3/1998 | Groll et al. | |
| 5,799,408 A | * | 9/1998 | Sprayberry | 33/645 |
| 5,920,999 A | * | 7/1999 | Hutter | 33/645 |
| 6,122,813 A | | 9/2000 | Roy et al. | |
| 2003/0217477 A1 | * | 11/2003 | Thurmaier | 33/645 |
| 2004/0003508 A1 | * | 1/2004 | Wu | 33/613 |

* cited by examiner

Primary Examiner—Diego Gutierrez
Assistant Examiner—R. Alexander Smith
(74) Attorney, Agent, or Firm—Dobrusin & Thennisch PC

(57) ABSTRACT

The apparatus forms a combined locating pin and gage for supporting and measuring two pieces of an assembly. The method for using the apparatus includes measuring an opening within each piece of the assembly using the limit gage portion of the apparatus and then locating the pieces together to form a temporary assembly using the gage as the shank of the locating pin portion of the apparatus. The apparatus includes a handle and a shank extending from the handle. In order to use the locating pin and gage apparatus, the mid-section of the shank forms a limit gage and has an outer diameter of a fixed dimension for measuring an opening within the two pieces of the assembly. If the diameter of each opening is within the predetermined limit set for the openings, then the handle of the apparatus is rotated in either direction, correspondingly rotating the lower locking section and causing the locking section to contact the lower piece, effectively temporarily and positively locking the assembly together.

26 Claims, 3 Drawing Sheets

LOW PROFILE, ONE HAND GO-NO-GO GAGE AND LOCATOR

FIELD OF THE INVENTION

This invention relates generally to an apparatus and method for gaging and locating two pieces of an assembly having an opening of fixed dimension within a piece forming the assembly. More particularly, the invention is a go-no-go gage and locator including a method that may be performed as a single-hand operation.

BACKGROUND OF THE INVENTION

Numerous types of locating pins are known in the prior art as operable to support a part on a machine or position two parts together in an assembly operation. These locating pins are often used in conjunction with a gage or gage plate for determining proper spacing of openings, opening size and location of the openings within the parts to be assembled. Generally, the process of measuring and temporarily assembling parts during production is at least a two-step process.

Locating pins are often round and have a relieved configuration. A typical locating pin is the Ball Lock Pin manufactured by Carr Lane and available on the Internet at the Carr Lane website. These pins, as with most lock pins, have a large handle for gripping and activating the locking balls located at the lower end of the shank. These lock pins maintain a locked position until released by pushing a button located in the handle. The button moves the center spindle forward to allow the locking balls to retract into a radial groove. Although these locking pins have positive locking, the locking action is only as strong as the friction between the locking ball surface and the part. This surface area is at best minimal and limited to the point of the locking ball contacting the surface of the part. A further disadvantage is the large handle that prevents use of the locking pin in tight quarters within a minimal area. Since activation of the locking pin requires releasing a button located on the top of the handle, this combination of a large handle and uppermost the top of the handle, this combination of a large handle and uppermost release mechanism requires a large amount of vertical space to effectuate the pin.

Other locating pins are generally formed of a bushing and an actuatable ball lock. This locating pin combination requires accurate placement of a receiver bushing within one part for cooperation with ball lock that generally is screwed in to the bushing. Such locating pins require at least a two-step process and a two-hand operation to successfully locate and temporarily engage the parts within an assembly.

Gages, such as limit gages—or go no-go gages—are expensive and time consuming to manufacture because each end must be manufactured to precise dimensions within certain tolerances. This additional tooling also adds expense and time to the assembly operation.

SUMMARY OF THE INVENTION

The present invention provides an apparatus and method for placing either individually or in combination a locator and/or a go no-go gage operation or methodology. The apparatus of the present invention forms a combined locating pin with optional hold-down mechanisms and gage for supporting and measuring two pieces of an assembly. The method for using the apparatus includes measuring an opening within each piece of the assembly using the limit gage portion of the apparatus and then locating the pieces together to form a temporary assembly using the gage as the shank of the locating pin portion of the apparatus.

The apparatus includes a handle and a shank extending from the handle. The shank is formed of a mid-section and a lower locking section. A shaft extending from the handle, through the mid-section, to the locking section, rotatably connects the handle and locking section. The handle is formed with a low profile and activates the locking mechanism by push down or rotation along a horizontal plane. This allows the use of the locking pin in tighter areas than the previously known locking pins. The mid-section and locking section have matching cam surfaces that, upon rotation, form a large surface area in contact with and sandwiching the assembly, providing a positive lock of the assembly while restricting 5 degrees of freedom of the pieces to each other and the assembly. The entire apparatus is spring loaded or spring-biased and comprises either a locked (i.e. closed) or unlocked position.

In order to use the locating pin and gage apparatus, the mid-section of the shank forms a limit gage and has an outer diameter of a fixed dimension for measuring an opening within at least one piece, and more preferably at least two pieces, of the assembly. If the diameter of each opening is within the predetermined limit set for the openings, then the handle of the apparatus is rotated in either direction, correspondingly rotating the lower locking section and causing the locking section to contact the lower piece, effectively temporarily and positively locking the assembly together. Additionally, since the low profile handle effectively temporarily locks the assembly together by horizontally rotation, the locking of the assembly may be successfully performed with a single hand of the user. As such, the user may perform multiple gaging and temporary locking steps with a multiple supply of the invention at one time.

In addition, the present invention further provides and discloses an apparatus and method for locating, adjusting, and/or locking a variety of household, commercial, and industrial mechanisms and applications. For example, the present invention may have particular application for use as a locator, locking mechanism, quick release mechanism or other hold down for use in automotive, aerospace, marine, rail, transportation vehicles or other devices that would benefit from a system to facilitate secure and fast locking/unlocking of equipment, including seat adjustment, child and safety equipment, cargo applications or the like. Such applications may further include cargo restraints and hold-downs for the placement and transport of luggage and equipment in vehicles, luggage racks, tailgates, lift-gates, beds, liners, all of which may encompass adjustable and/or locking features. Additional benefits and advantages of the present invention will become apparent to those skilled in the art to which this invention pertains from reading the subsequent description of the preferred embodiment in conjunction with the accompanying drawings.

DESCRIPTION OF THE PREFERRED EMBODIMENT

Figure 1:
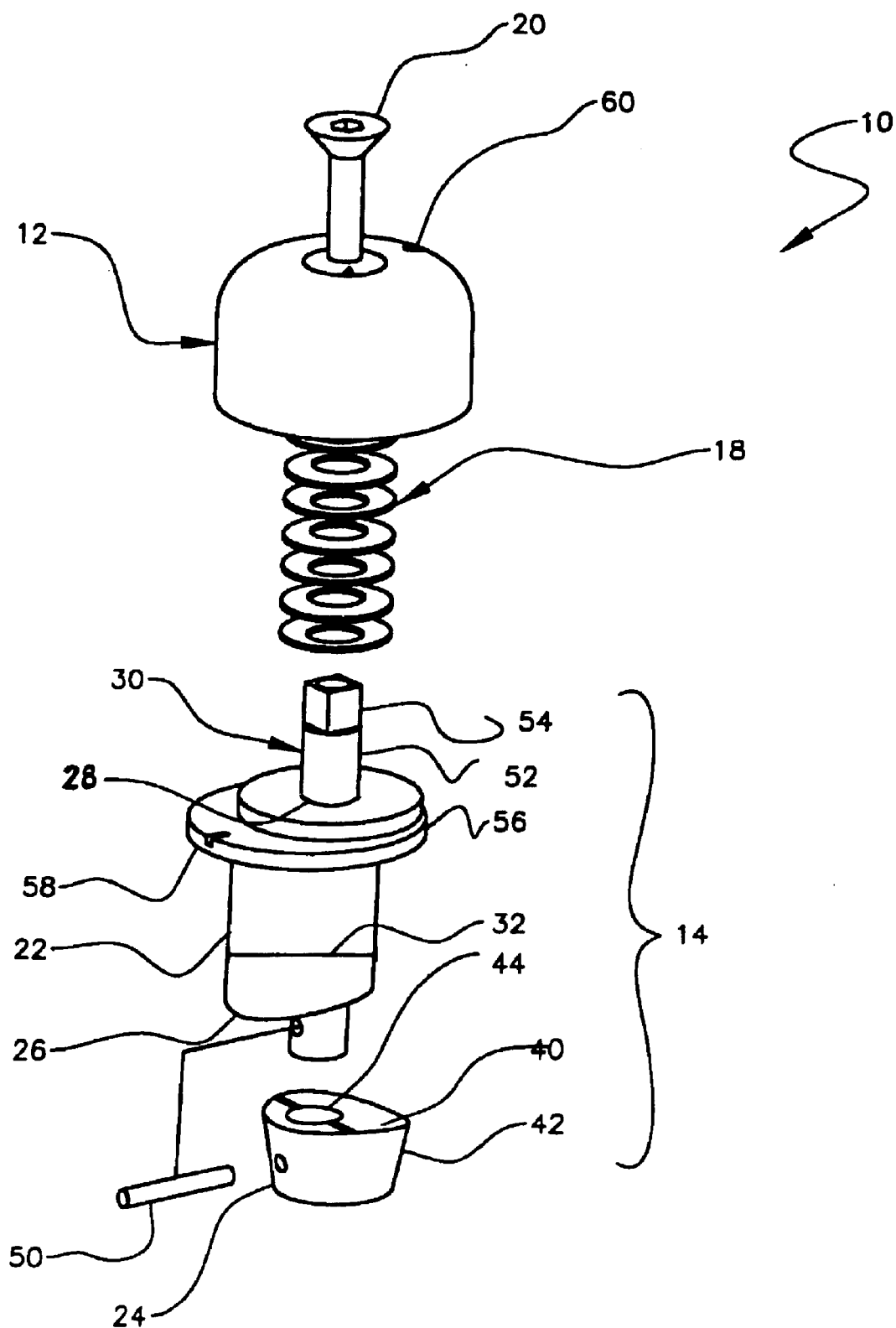
FIG. 1 illustrates an exploded view of the locating pin and gage of the present invention.

FIG. 1 illustrates an exploded view of the locating pin and gage 10 of the present invention having a handle 12 and a shank 14 extending downwardly from the handle 12.

Figure 2:
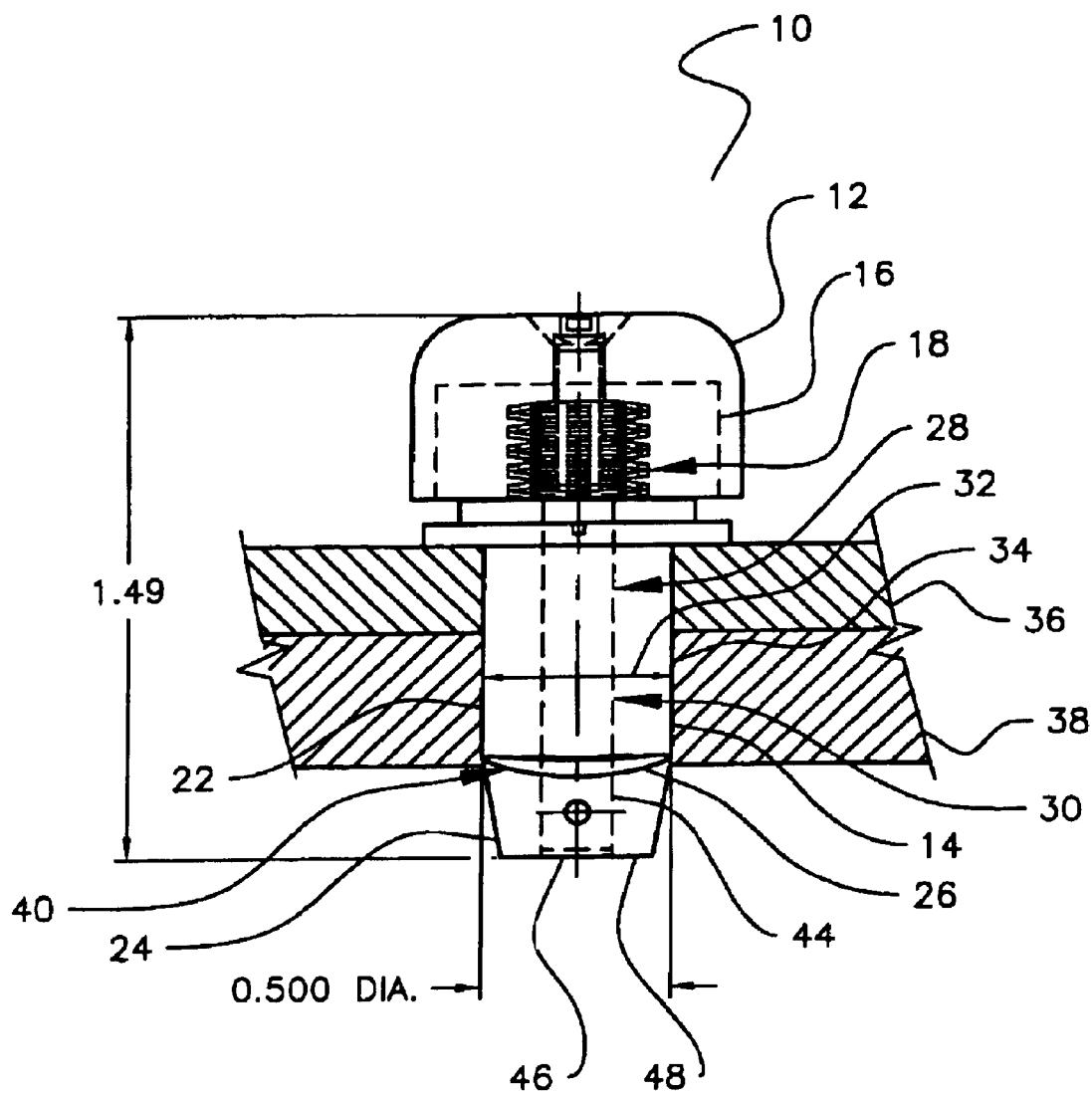
FIG. 2 illustrates a front view including a section revealing the internal workings of the locating pin and gage in an unlocked position.
Figure 3:
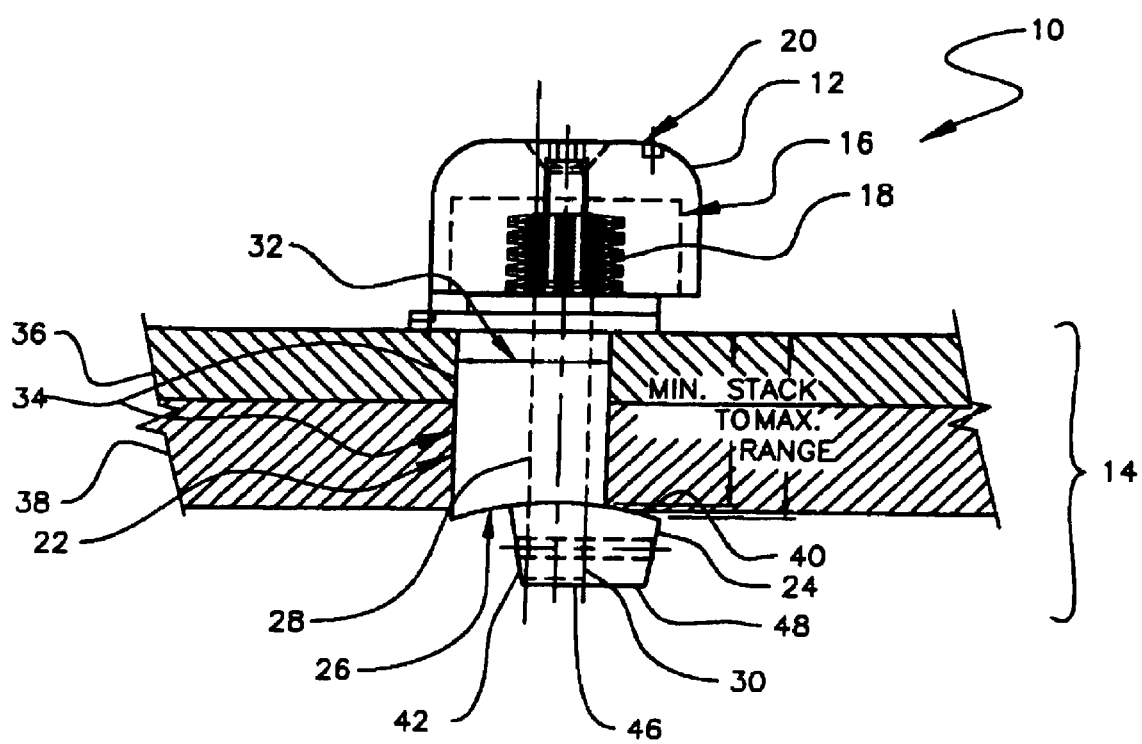
FIG. 3 illustrates a side view including a section revealing the internal workings of the locating pin and gage in a locked position.

FIGS. 2 and 3 illustrate the handle 12 having a hollow center 16 for housing a spring 18 and an attachment means such as a screw 20 for rotatably attaching the handle 12 to the shank 14. The handle 12 is preferably formed with a low horizontal profile to allow the locking pin and gage 10 to be used in tight areas.

The shank 14 includes a mid-section 22 and a locking section 24. The mid-section 22 includes a cam surface 26 opposite the handle 12 and an opening 28 extending the length of the mid-section 22 for seating a shaft 30. The opening 28 is preferably off-center of the central vertical axis of the mid-section 22. The mid-section 22 is preferably formed having an outer diameter 32 of a fixed dimension for measuring an aligned opening or openings 34 within at least one or preferably two pieces 36, 38 of an assembly, for example, and acts as a limit gage determining whether the opening(s) 34 agree with certain prescribed dimensions of an assembly.

The locking section 24 includes a cam surface 40 matching the cam surface 26 of the mid-section 22. The locking section 24 also has a tapered end 42 opposite the cam surface 40 and an opening 44 extending the length of the locking section 24 for seating shaft 30. The opening 44 is preferably aligned with the opening 28 and is therefore off-center of the central vertical axis of the locking section 24 or a taper portion of the section 24.

The shaft 30 extends the length of the locating pin and gage 10 within the openings 28, 44 and preferably seats on at least one edge 46 within the locking section 24 to ensure that the shaft 30 does not extend below the bottom edge 48 of the locating pin and gage 10. The shaft 30 is fixed to the locking section 24 by any type of attaching means such as a screw or roll pin 50, which may be used in operation with the handle 12. The upper end 52 of the shaft 30 extends above the shank 14 and together with handle 12 and provides a seat 54 for the spring 18. The upper end 52 is then seated with the spring 18 within the hollow center 16 of the handle 12. The handle 12 is fixed to the shaft 30 by any type of attaching means such as a screw 20.

The mid-section 22 may also includes an enlarged, and preferably circular-shaped, surface area 56 opposite the cam surface 26 and having an outer dimension larger than the outer dimension 32 of the shank 14 forming the upper or limit gage portion of the invention. The enlarged surface area 56 and handle 12 may also include corresponding markers 58, 60 for indicating a locked and unlocked position of the locating pin portion of the invention. The diameter of area 56 is concentric with diameter 32 of the mid-section 22 and has a diameter equal with the maximum diameter of parts 34 and 36. Therefore if the opening 34 is greater than the maximum diameter of allowed tolerance, the locator 10 and edge 56 will abut, thereby it will not be able to lock, and will identify a greater than upper limit condition if the opening 34 is less than the minimum diameter of parts 34 and 36, identified on the gage by diameter 32. Hence, the locator will not go through opening 34 (and thereby will identify a less than lower limit condition) resulting in the locator locking if both parts 36 and 38 have an opening 34 within allowable limits.

To use the locating pin and gage 10 of the present invention, and by way of example, two pieces 36, 38 of an assembly may include an opening 34 in each piece that needs to be of a certain dimension and requiring the pieces to be temporarily locked together if dimensionally correct. The preferred method of the present location includes aligning the openings 34 of each piece 36, 38 and inserting the locating pin and gage 10 within the openings 34. The outer diameter 32 of the mid-section 22 of the shank 14 is used to measure and determine if the diameter of the openings 34 are within the predetermined limit set for the openings. As with all limit gages, the tolerance required is job specific and is generally equal to the average or outer diameter of the shank 14.

If the diameters 36, 38 are within the required limits, positive locking of the two pieces 34 of the assembly is created by pushing and rotating the handle 12 180 degrees about the shank 14 about the vertical axis of the locating pin and gage 10. This is successfully accomplished where the locating pin and gage 10 is spring loaded or spring-biased in a locked or unlocked position.

When unlocked the shaft 30 is fixedly attached to the handle 12 at one end 52 and the locking section 42 at the opposite end. In this position, the markers 58, 60 are aligned indicating an unlocked position. The locating pin and gage 10 is inserted in the openings 34 of the assembly. Along with the outer diameter 32 of the shank 14, the length of the mid-section 22 extending between the enlarged surface area 56 and the cam surface 26 may be predetermined to equal or less than the total width of the assembly, i.e., the overall width of pieces 36, 38, to ensure positive locking of the assembly. When the assembly height stack is larger, the cam will activate or push the assembly together through the force of the spring. The force of the spring may be adjustable or biased as an optional means of activating or loading the assembly.

As best shown in FIG. 3, rotation of the handle 12 rotates the locking section 24 about the offset vertical shaft 52. Since the mid-section 22 of the shank 14 is not fixed to the shaft 52, the mid-section 22 remains stationary to rotated handle 12 and locking section 24. In this position, the markers 58, 60 are not aligned 180 degrees opposite, indicating a locked position. The total height of parts 36 and 38 needed for the locking feature to work should be within the tolerance of the "minimum stack" and "maximum range" dimensions identified in FIG. 3. The cam 40 and 26 has a height that equals the difference between the minimum and maximum range or stack dimensions. The cam surfaces 26, 40 oppose each other on opposite sides of the assembly causing positive locking and hold down of the assembly between the cam surfaces and the enlarged surface area while restricting five degrees of freedom of movement of the pieces to each other and as a whole assembly. It is also contemplated that the present invention can comprise a plurality of locked parts or an assembly of locked parts which may or may not be capable of being disassembled depending upon the desired application wherein the height of the cam will allow some play on the vertical axis, as long as the force that pulls 36 apart from 38 overcomes the force of the spring. However, unless the device is unlocked the parts 36 and 38 cannot be disassembled. Still further, the present invention may comprise a plurality of locked parts which can be assembled and disassembled and may also comprise cam surfaces 26 and 40 opposing each other on opposite sides of the assembly. Implementing a low profile handle that effectuates locking and unlocking of the locking pin along the vertical axis successfully provides a mechanism that may be used in tighter and smaller areas. The easy rotation mechanism also allows the user to limit the method of use to a single hand operation. Additionally, the larger contact surface areas sandwiched between the cam surfaces of the mid-section and locking section provides a positive locking of the assembly, dependent on the overall locking pin and gage rather than the friction points of the common ball lock described above. Thus, multiple locking pin and gages 10 having different dimensions may be easily be carried and used simultaneously by the user.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof.

Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A locating pin and gage for supporting and measuring two pieces of an assembly having an opening of fixed dimension within a piece forming the assembly, said locating pin and gage comprising:
    a handle; and
    a shank extending downwardly from said handle;
    said handle comprising a hollow center for housing a spring and means for rotatably attaching said handle to said shank;
    said shank comprising a mid-section and a locking section, said mid-section comprising a cam surface opposite said handle and an opening extending the length of said mid-section, offset from the vertical center of said mid-section;
    said locking section comprising a cam surface matching said cam surface of said mid-section, a tapered end opposite said cam surface, and an opening extending the length of said locking section, offset from the vertical center of said locking section; wherein said locking section is attached to said handle with a shaft.

2. The locating pin and gage defined in claim 1, wherein said shaft extends the length of said locating pin and gage within said offset opening of said mid-section and said locking section; said shaft affixed to said locking section at one end and said handle at the opposite end, wherein said shaft rotates freely within said offset opening of said mid-section.

3. The locating pin and gage defined in claim 2, said shaft further comprising a surface for seating and loading said spring within said handle.

4. The locating pin and gage defined in claim 1, said shank further comprising a limit gage, said mid-section of said shank having an outer dimension for measuring an opening within the two pieces of the assembly to determine if said opening agrees with certain prescribed dimensions of said assembly.

5. The locating pin and gage defined in claim 4, said mid-section further comprising an enlarged surface area opposite said cam surface and having an outer dimension greater than the outer dimension of said shank.

6. The locating pin and gage defined in claim 5, said locking section further comprising a positive hold down of said assembly while restricting 5 degrees of freedom of said assembly when said cam surface of said locking section is rotated about said shaft upon rotation of said handle, wherein said biased spring maintains said cam surface of said locking section against said cam surface of said mid-section.

7. The locating pin and gage defined in claim 6, said enlarged surface area and said handle further comprising corresponding markers indicating a locked and an unlocked position of said locating pin.

8. A method for measuring and positioning two pieces of an assembly, each piece having an opening of fixed dimension for positioning a locating pin and gauge, said method comprising the steps of:
    aligning the openings of each piece,
    inserting said locating pin and gage into said openings, said locating pin and gage comprising a handle and a shank extending downwardly from said handle, wherein said shank comprises a mid-section and a locking section and wherein said locking section is attached to said handle with a shaft;
    measuring the dimension of said openings to the outer dimension of said shank by determining if said dimension of said openings is within the predetermined limit set for said openings, wherein said limit is equal to said outer dimension of said shank;
    if said outer dimensions are within said limit, positively locking said two pieces of an assembly together by rotating said handle about said shank to a locked position; and
    restricting 5 degrees of freedom of said assembly when said locating pin is in said looked position, wherein all steps are capable of being performed with a single hand of the user.

9. The method for measuring and positioning two pieces of an assembly as defined in claim 8, further comprising the step of:
    unlocking said pieces by rotating said handle about said shank in the opposite direction; and
    removing said shank from said openings.

10. The method for measuring and positioning two pieces of an assembly as defined in claim 8, further comprising the step of:
    unlocking said pieces by rotating said handle about said shank to an unlocked position; and
    removing said shank from said openings.

11. The method for measuring and positioning two pieces of an assembly as defined in claim 10, said mid-section of said shank having said outer dimension of a fixed dimension for measuring said opening within the two pieces of the assembly to determine if said opening agrees with certain prescribed dimensions of said assembly.

12. The method for measuring and positioning two pieces of an assembly as defined in claim 11, said mid-section further comprising a cam surface opposite of said handle and an enlarged surface area opposite said cam surface and having an outer dimension greater than the outer dimension of said shank.

13. The method for measuring and positioning two pieces of an assembly as defined in claim 8, said handle comprising a hollow center for housing a spring and means for rotatably attaching said handle to said shank;
    said mid-section comprising a cam surface opposite said handle and an opening extending the length of said mid-section, offset the vertical center of said mid-section;
    said locking section comprising a cam surface matching said cam surface of said mid-section, a tapered end opposite said cam surface, and an opening extending the length of said locking section, offset from the vertical center of said locking section.

14. The method for measuring and positioning two pieces of an assembly as defined in claim 13, wherein said shaft extends the length of said locating pin and gage within said offset opening of said mid-section and said locking section; said shaft affixed to said locking section at one end and said handle at the opposite end, wherein said shaft rotates freely within said offset opening of said mid-section.

15. The method for measuring and positioning two pieces of an assembly as defined in claim 14, said shaft further comprising a surface for seating and loading said spring within said handle.

16. The method for measuring and positioning two pieces of an assembly as defined in claim 15, said positively locking step further comprising the step of compressing said spring between said handle and said shank upon rotation of said handle about said shank.

17. The method for measuring and positioning two pieces of an assembly as defined in claim 16, said locking section further comprising a positive hold down of said assembly while restricting 5 degrees of freedom of said assembly when said cam surface of said locking section is rotated about said shaft upon rotation of said handle, wherein said biased spring compresses and maintains said cam surface of said locking section against said cam surface of said mid-section.

18. The method for measuring and positioning two pieces of an assembly as defined in claim 17, wherein said enlarged surface area and said handle further comprise corresponding marks indicating said locked position when said corresponding marks are oppositely located and said unlocked position when said corresponding marks are adjacently located of said locating pin.

19. A locating pin and gage for supporting and measuring two pieces of an assembly having an opening of fixed dimension within a piece forming the assembly, said locating pin and gage comprising:

a handle; and a shank extending downwardly from said handle;

said shank comprising a mid-section and a locking section, said mid-section comprising a limit gage having an outer dimension for measuring an opening within the two pieces of the assembly to determine if said opening agrees with certain prescribed dimensions of said assembly, said locking section being attached to said handle and in a cammed relationship with said mid-section.

20. The locating pin and gage defined in claim 19, said handle further comprising a hollow center for housing a spring and means for rotatably attaching said handle to said shank;

said mid-section comprising a cam surface opposite said handle and an opening extending the length of said mid-section, offset from the vertical center of said mid-section; and said locking section comprising a cam surface matching said cam surface of said mid-section, a tapered end opposite said cam surface, and an opening extending the length of said locking section, offset from the vertical center of said locking section; wherein said locking section is attached to said handle.

21. The locating pin and gage defined in claim 20, wherein said attachment of said locking section to said handle comprises a shaft extending the length of said locating pin and gage within said offset opening of said mid-section and said locking section; said shaft affixed to said locking section at one end and said handle at the opposite end, wherein said shaft rotates freely within said offset opening of said mid-section.

22. The locating pin and gage defined in claim 21, said shaft further comprising a surface for seating and loading said spring within said handle.

23. The locating pin and gage defined in claim 22, said mid-section further comprising an enlarged surface area opposite said cam surface and having an outer dimension greater than the outer dimension of said shank.

24. The locating pin and gage defined in claim 23, said locking section further comprising a positive hold down of said assembly while restricting 5 degrees of freedom of said assembly when said cam surface of said locking section is rotated about said shaft upon rotation of said handle, wherein said biased spring maintains said cam surface of said locking section against said assembly offset from said cam surface of said mid-section and said opposing enlarged surface area.

25. The locating pin and gage defined in claim 24, said enlarged surface area and said handle further comprising corresponding markers indicating a locked and an unlocked position of said locating pin.

26. The locating pin and gage defined in claim 22, said mid-section further comprising an enlarged surface area opposite said cam surface and having an outer dimension greater than the outer dimension of said shank and equal to a maximum allowable dimension of said two pieces to be measured.

* * * * *